Sept. 20, 1971    J. O. DE BANG ET AL    3,606,554

BALL-POINT PEN

Filed July 7, 1969

INVENTOR,
JORGEN O. de BANG
BY HENRIK J. ROLIGHED;

ATTORNEY

United States Patent Office 3,606,554
Patented Sept. 20, 1971

3,606,554
BALL-POINT PEN
Jorgen O. de Bang, P.O. Box 4605, Nassau, Bahamas, and Henrik J. Rolighed, Vedskolle, pr. Vallo, Denmark
Filed July 7, 1969, Ser. No. 847,485
Int. Cl. B43k 7/12, 29/12
U.S. Cl. 401—105
4 Claims

ABSTRACT OF THE DISCLOSURE

The device includes a cartridge having a ball-point and axially positioned within a barrel. Inner and outer clips, connected together are movable internally and externally of the barrel. The inner clip engages the inner end of the cartridge to move it when the outer clip is moved. Locking means holds the inner clip in position under control of the outer clip. Both clips and the barrel have bores which align when the cartridge is retracted within the barrel. A slide carrying transparencies is movable within the barrel for viewing when the bores are aligned, the bores being unaligned when the cartridge is extended.

---

The invention provides a ball-point pen having features which are useful in advertising and which are pleasing souvenirs.

The invention has for an object a ball-point pen which incorporates a novel form of dual clips movable to project the ball-point pen from its barrel or to retract the same therein.

A further object is the provision of a ball-point pen wherein the barrel therefor carries a strip film in a slide movable longitudinally of the barrel together with magnifying and viewing means whereby material on the strip film may be viewed when the ball-point pen is retracted within the barrel.

Figure 1:
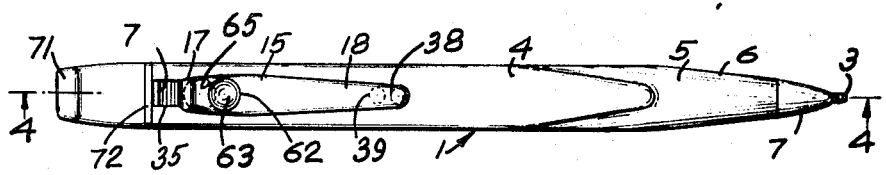
FIG. 1 is a plan view of the ball-point pen as an entirety and showing the ball-point projected from the barrel.
Figure 2:
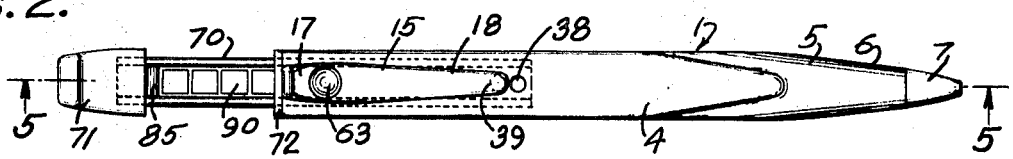
FIG. 2 is a plan view of the ball-point pen, the ball-point being retracted within the barrel and a slide being projected from one end of the barrel to expose strip film carried thereby.
Figure 3:
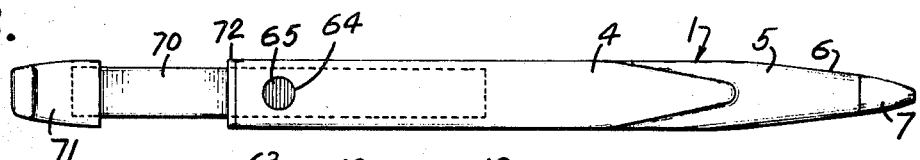
FIG. 3 is a plan view of the ball-point pen side diametrically opposite the side shown in FIG. 2.
Figure 4:
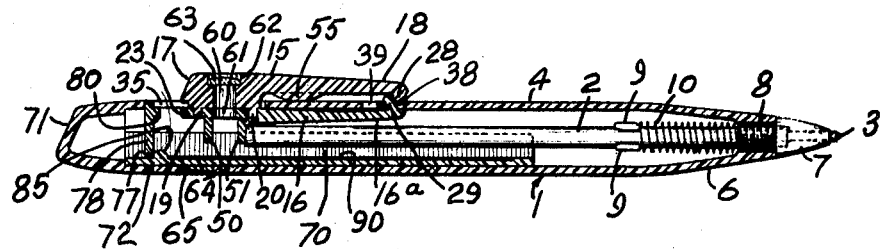
FIG. 4 is a longitudinal sectional view on the line 4—4 of FIG. 1.

Referring to the drawing, 1 is a barrel, 2 a cartridge positioned axially within the barrel 1 and provided with a ball-point 3. The cartridge contains a writing fluid of some character. The barrel 1 is substantially square sectioned having plane surfaces 4 for a portion of its length and a cylindrical or circular surface 5 for a remaining portion of its length, the circular surface 5 intersecting the plane surfaces. Surface 5 is tapered as shown at 6 to provide a finger piece and the end of the tapered portion merges with a ferrule providing tip 7, the tip having a screw threaded shank 8 threaded within the portion 5, as shown in FIG. 4. The cartridge 2 is provided with diametric ridges 9 and interposed between said ridges and an end of the shank 8 and surrounding the cartridge is a coil spring 10. Thus when the cartridge is moved toward the tip the spring 10 is compressed and the ball point extends beyond the end of the tip, or to the position shown in FIG. 1 from the position shown in FIG. 2.

Figure 5:
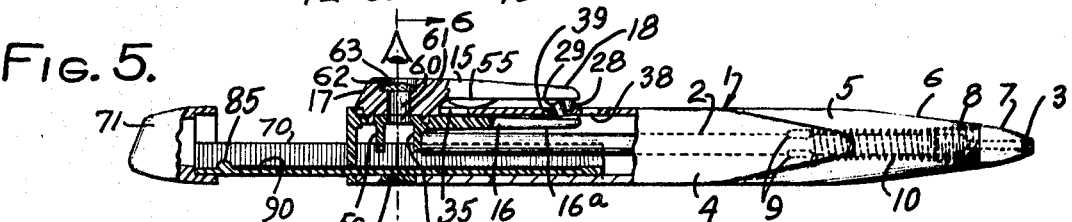
FIG. 5 is a fragmentary longitudinal sectional view on the line 5—5 of FIG. 2.
Figure 6:
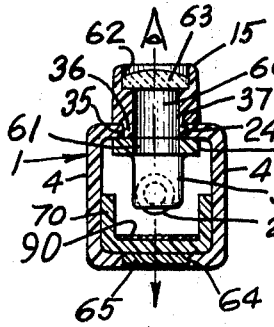
FIG. 6 is a transverse sectional view on the line 6—6 of FIG. 5, and on an enlarged scale.
Figure 7:
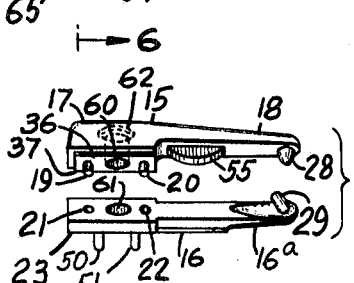
FIG. 7 is a detached view in perspective of inner and outer clips used in the practice of the invention.

The dual clip construction provides the means for positioning the ball-point outwardly of the tip or for holding the ball-point inwardly of the tip. The dual clip includes outer and inner members 15 and 16, member 15 having an enlarged portion 17 and an arm 18 extending therefrom. The base of the member 15 is provided with a pair of aligning pins 19 and 20 adapted to be received in holes 21 and 22 of the end 23 of member 16. Reception of the pins within the holes aligns the two members of the clip. The base portion of clip 15 has a reduced width and length portion whereby when the two members 15 and 16 are in joint cooperation an encircling groove is provided between said members as shown at 24 in FIG. 6. The outer end of arm 18 is provided with a conical transverse pin 28 and arm 16a of member 16 adjacent its outer end, is provided with a slanting pin 29. It will be noted that the pins are not in axial alignment as, for instance, shown in FIG. 5. When the pins 19 and 20 are received within the holes 21 and 22 and the base portions of said members are fastened together, the under surface of the arm 18 is positioned above the top surface of the arm 16a of member 16. The inner end of the barrel 2 has one surface longitudinally slotted, as shown at 35, and as this portion is square sectioned, as shown in FIG. 6, facing flanges are formed at 36 and 37 which are received within the groove 24 provided by the base of the member 15 when joined with the base of member 16. The barrel is provided with two transverse holes and the dual clip is so constructed that the dual clip may be moved within the slot 35 of the barrel by pushing on the inner end of the clip member 15 to extend the ball-point or when the clip member 15 is moved backwardly to retract the ball-point. Thus the clip member 16 is provided with two spaced apart and substantially parallel lugs 50 and 51 and lug 51 is adapted to engage the inner end of the cartridge 2 to move the same to project the ball-point through the tip when the clips are moved forwardly. The bottom surface of the arm member 18 of clip member 15 is provided with a segmental enlargement 55 which is adapted to ride on the top surface of the barrel as shown in FIGS. 4 and 5. This enlargement assures that the bottom clip member maintains its position when the ball-point is extended and during a writing operation. When the clip 15 is moved forwardly in the slot 35, the slanting pin 29 carried by the bottom clip member 16 will move outwardly from the hole 39 by camming action and into the hole 38. Any pressure exerted on the ball tip will be transmitted to the pin 29 which, due to its angular position within the hole 38, will not allow the ball-point to retract. To retract the ball-point, downward pressure on the end of the arm 18 of clip member 15 moves the conical pin which is offset forwardly of pin 29 into engagement with the slanting pin 29 and cams the slanting pin from the hole 38 to allow retraction of the ball-point by spring 10. The base portions of both clip members have axially aligned bores at 60 and 61 and it will be noted that the bore 61 lies intermediate members 50 and 51. Hole 60 is enlarged at 62 to receive a lens 63 and the barrel is provided with a bore 64 in alignment with the bores 60 and 61 when the ball-point is retracted within the barrel or in the position shown in FIG. 5. Hole 64 is adapted to receive a window 65 for the purpose of admitting diffused light through the bores 60 and 61.

Half round or segmental enlargement 55 acts as a fulcrum member when the end of arm 18 is depressed as the fulcrum member rests upon the outer surface of the casing and the conical pin 28 engages the pin 29 of the clip member 16 to cam the same from the hole 38 when it is desired to retract the ball-point within the clip as shown in FIG. 5. When the stud or pin 29 is moved to the forward hole 38, bending stress on the arm 16a of the clip 16 is relieved, as seen in FIG. 4, and bending stress on the arm is likewise relieved when the pin is within the hole 39, as shown in FIG. 5. The only time that stress is imposed upon either clip arm is during movement of the clip from one hole to a following hole whether forwardly or backwardly as the studs or pins then ride upon the outer and inner surfaces of the barrel.

Figure 8:
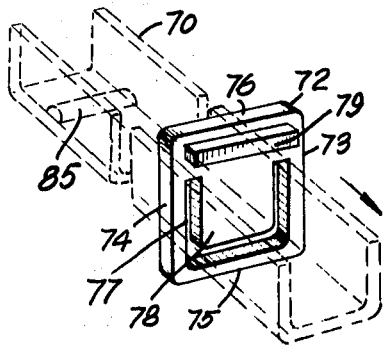
FIG. 8 is a fragmentary perspective view, a slide, shown in dotted lines, and a guide wall therefor.
Figure 9:
FIG. 9 is a perspective view of a strip film of the type carried by the slide.

The slide or tray 70 is an elongated transparent member of channel cross section, as shown best in FIGS. 6 and 8. The tray has slide movement within the barrel 1 and the outer end of the tray is secured within and to a cap or head member 71, the cap being hollow and is square sectioned so as to merge smoothly with the inner end of barrel 1. The tray fits closely within the barrel 1 as shown in FIG. 6. The tray has a length substantially equal to the length of the square sectioned portion of the barrel. The end of the square sectioned portion of the barrel is closed by a framing 72, the framing having sides 73 and 74, a base 75 and a top 76, the sides and base being defined by a U-shaped slot 77 and by a flexible tab or tongue 78 depending from the top 76. The top 76 is provided with a projecting transverse piece 79 adapted to be received within the end of the barrel as shown in FIGS. 4 and 5 at 80. The framing is otherwise held to the barrel end by gluing. The slide or tray is provided with a transverse enlargement 85 adjacent the cap 71. When the tray is positioned within the square sectioned barrel or moved from the position of FIG. 5 to that of FIG. 4, the bottom edge of the flexible tab or tongue 77 will engage the enlargement 85, which is half-round in transverse section, and snap over the same to lock the tray within the barrel with the cap abutting the end of the framing 72, as shown in FIG. 4. When the cap is moved outwardly from the position of FIG. 4 to that of FIG. 5 the tab or tongue will snap over the enlargement 85 to permit extension of the tray from the barrel. The interior of the tray on its base or web portion has secured thereto a transparency 90. This transparency may be a strip film such as shown in FIG. 9 having multiple frames, each frame serving, for example, as an advertising medium or having pictures of different subjects such as scenic views, when the ball-point pen functions as a souvenir, or carries other subjects on the frames depending upon the purpose of the ball-point pen other than as a writing implement.

The operation, uses, and advantages of the invention are as follows.

Assuming a transparent strip film is cemented or otherwise secured to the base or web of the tray with the tray positioned within the barrel as shown in FIG. 4, and that the ball-point pen is to be utilized for writing purposes, the ball-point will extend through the tip as shown in FIG. 4 wherein the dual clip structure is moved for reception of pin 29 within the forward hole 38. At this time it will be observed that the lens 63 is out of axial alignment with the window 65 carried by the barrel and therefore, the transparency may not be seen or observed as the window must allow light to enter through the transparent tray to illuminate a frame so that the frame can be observed by the eye 90 positioned above the lens 63. If it is desired to view the strip film, the dual clip structure releases the cartridge to retract the ball-point upon depressing the outer end of the clip arm 18 which cams the stud 29 from hole 38 to permit movement by the spring 10 of the dual clips rearwardly of the casing, the stud 29 being received within the hole 39. At this time the lens 63 is in alignment with the window 65 whereby the tray may be moved outwardly from the casing progressively to allow viewing of the images on the frames of the film transparency 90. The film frames can only be observed when the ball-point is retracted within the casing.

We claim:

1. A ball-point pen having a barrel, a ball-point cartridge within the barrel with means for projecting the ball-point outwardly from the barrel and inwardly thereof, the improvement consisting of: a pair of clips one exterior of the barrel and one interior thereof the clips being joined together and both clips being movable longitudinally of the barrel, means secured to the inner clip for contact with an end of the cartridge to move the cartridge and project the ball-point, and means for retracting the cartridge and ball-point within the barrel when the clips are moved to a retracted position, the inner and outer clips having arms extended from base portions, the base portions of the clips being the portions joined and each arm provided with a pin; the barrel formed with a hole which receives the pin of the arm on the innermost clip to maintain the cartridge and the ball-point extended from the barrel, the pin carried by the arm of the external clip being offset forwardly relative to the pin of the arm the innermost clip and whereby when the outermost clip arm is depressed, the pin cams the pin of the arm of the innermost clip from the hole to allow retraction of the cartridge and the ball point within the barrel.

2. The device as set forth in claim 1, the barrel having a second hole for receiving the pin of the arm of the innermost clip to limit the retraction within the barrel of the cartridge.

3. A writing instrument of the type which has a barrel, a cartridge within the barrel and a ball-point for one end of the cartridge, which cartridge and ball-point is adapted to be extended from or retracted within the barrel with means for projecting the cartridge and ball-point and for retracting the cartridge and ball-point within the barrel, the improvement consisting of: a pair of clips joined together at one end, the barrel being formed with an elongated slot for receiving the joined together ends of the clips whereby the clips may slide relative to the barrel, one clip being exterior of the barrel and the other interior thereof, and said interior clip engaging an end of the cartridge whereby slide movement of the clips will project the ball-point from an end of the barrel, each clip having an extended arm and each clip arm having a pin at one end thereof, the pins being in spaced aligned relationship, and the barrel provided with two spaced apart holes, the pin of the inner arm received in a hole when the ball-point is extended from the barrel, depression of the arm of the outermost clip causing the pin thereof to engage the pin of the innermost clip to cam the same from the hole to allow retraction of the cartridge and the ball-point within the barrel, the pin of the innermost clip arm being received in the second hole to limit the degree of retraction.

4. The device as set forth in claim 3, and means for retracting the cartridge and the ball-point within the barrel when the pin is cammed from the first hole.

References Cited

UNITED STATES PATENTS

| 2,790,422 | 4/1957 | Grumbach | 401—104X |
| 3,087,464 | 4/1963 | Wittnebert et al. | 401—292X |

FOREIGN PATENTS

| 979,882 | 1/1965 | Great Britain. |

LAWRENCE CHARLES, Primary Examiner

U.S. Cl. X.R.

401—195